United States Patent
Douais et al.

(10) Patent No.: US 6,251,515 B1
(45) Date of Patent: Jun. 26, 2001

(54) COMPOSITE MATERIAL COMPRISING A SELF-ADHESIVE COMPOSITION COATING LAYER

(76) Inventors: Patrick Douais, La Hermeraie, Le Noyer en Ouche (FR), 27410; Didier Juhue, 35, Rue Gaston Foloppe, Bernay (FR), 27300; Olivier Julien, Résidence le Jardin, Bernay (FR), 27300; Michael Werth, 7, Rue de l'Union, Bernay (FR), 27300

( * ) Notice: Subject to any disclaimer, the term of this patent is extended or adjusted under 35 U.S.C. 154(b) by 0 days.

(21) Appl. No.: 09/432,384

(22) Filed: Oct. 29, 1999

Related U.S. Application Data

(62) Division of application No. 08/899,329, filed on Jul. 23, 1997, now Pat. No. 6,011,100.

(30) Foreign Application Priority Data

Jul. 23, 1996 (FR) .................................................. 96 09237

(51) Int. Cl.$^7$ ..................................................... B32B 15/08
(52) U.S. Cl. .......................... 428/330; 524/425; 428/323; 428/457; 428/458; 428/474.4
(58) Field of Search .............................. 524/425; 428/323, 428/332, 457, 458, 474.4, 330

(56) References Cited

U.S. PATENT DOCUMENTS

| | | | | |
|---|---|---|---|---|
| 3,935,305 | * | 1/1976 | Delaney et al. | 424/49 |
| 4,690,856 | * | 9/1987 | Ito et al. | 428/215 |
| 4,980,395 | * | 12/1990 | Mathur et al. | 523/200 |

FOREIGN PATENT DOCUMENTS

| | | |
|---|---|---|
| 200527 | 5/1983 | (DE) . |
| A1-412888 | 2/1991 | (EP) . |
| WO 95/01403 | 1/1995 | (WO) . |

* cited by examiner

Primary Examiner—D. S. Nakarani
Assistant Examiner—Christopher Paulraj
(74) Attorney, Agent, or Firm—Pennie & Edmonds LLP

(57) ABSTRACT

The invention relates to a self-adhesive powder composition with improved resistance to creep, based on thermoplastic and/or heat-curable resins and acicular calcium carbonate. The composition is applied in powder form onto a metal substrate and then a creep-resistant coating is obtained by melting the powder.

7 Claims, No Drawings

COMPOSITE MATERIAL COMPRISING A SELF-ADHESIVE COMPOSITION COATING LAYER

This is a division of application Ser. No. 08/899,329, filed Jul. 23, 1997, now U.S. Pat. No. 6,011,100.

TABLE OF CONTENTS

1. Background of The Invention
1.1 Technical Field
1.2 Description of Related Art
2. Description of The Invention
3. Description of The Preferred Embodiments
4. Claims
5. Abstract of The Disclosure

1. BACKGROUND OF THE INVENTION

1.1 Technical Field

The invention relates to powder self-adhesive compositions with improved resistance to creep, based on thermoplastic and/or heat-curable resins for coating metal substrates.

1.2 Description of Related Art

Polyamide, polyolefin, polyester and/or polyurethane resins are commonly employed for coating metal substrates, especially because of their good. mechanical properties such as abrasion resistance and impact strength and their chemical inertness towards many products such as hydrocarbons, bases and inorganic acids.

However, it is known that the adhesiveness of these resins to metals is generally inadequate because, for example, of poor wettability. To overcome this defect, the metal support is coated with an undercoat, called adhesion primer, to ensure the bonding and the mechanical anchoring of the polyamide powder. In general, the adhesion primer employed is based on heat-curable resins and is applied in the form of powder, in solution or in suspension in organic or aqueous solvents. Provision must therefore be made for additional facilities for possible removal of the solvents and for curing the primer before the coating of the substrate thus clad with the polyamide powder. In addition, curing and/or drying the primer significantly increases the duration of the coating operations, and hence their cost.

Given the above-mentioned disadvantages, it is increasingly being preferred to eliminate the adhesion primer and to improve the direct adhesion of the coating to the substrate.

Thus, in European Patent Application No. EP 412 888 there is described mixtures of polyamides and of epoxy/sulfonamide resins which can be employed for coating metal substrates without employing any adhesion primer. These mixtures of polyamide and of epoxy/sulfonamide resins in powder form can be applied onto the substrate with an electrostatic gun. It then suffices to introduce the substrate thus clad into an oven to obtain melting of the powder and a uniform coating. The substrate can also be preheated above the melting point of the powder and immersed in a fluidized bed of the powder.

PCT International Patent Application No. PCT/FR95/01740 discloses pulverulent compositions based on polyamide, on ethylene copolymers and on unsaturated carboxylic acids or their vinyl or other esters, and, optionally, on copolymer of ethylene and vinyl alcohol. However, the adhesion of such existing coatings which are applied without a primer is still inferior to that of the coatings with a primer, especially where resistance to creep is concerned.

2. Description of the Invention

The applicants have now found anticreep additives for self-adhesive powder compositions, i.e. those which are intended to coat metal substrates without any adhesion primer.

The anticreep additives of the invention improve the creep resistance of the self-adhesive compositions into which they are incorporated, so that the creep resistance of the coating films which are applied without any primer approaches that of the coating films applied over a primer. The anticreep additives are precipitated calcium carbonates (PCC), which, when uncoated, have specific (BET) surface area of from about 7 $m^2/g$ to about 12 $m^2/g$, measured according to ISO standard 9277, and free-flow apparent specific weight of from about 130 g/l to about 180 g/l and, preferably, equal to approximately 150 g/l, measured according to ISO standard 903.

The compositions of the invention are intimate mixtures based on the resins and the anticreep additives described above.

The resins or polymers of the coating compositions may be thermoplastic resins or heat-curable resins. By way of example of thermoplastic resins, there may be mentioned polyolefins such as PE (polyethylene), PP (polypropylene) and their copolymers or blends; PVC (polyvinyl chloride); and aliphatic, cycloaliphatic and/or aromatic polyamides such as PA-11, PA-12, PA-12,12, PA-6, PA-6,6, PA-6,12 and polyamide-based thermoplastic elastomers, used alone, mixed and/or copolymerized.

By way of example of heat-curable resins, there may be mentioned epoxy resins, epoxy/phenolic resins and epoxy/polyester hybrids.

The acrylic, polyester and polyurethane resins which are also suitable may be either thermoplastic or heat-curable.

Polyesters are intended to mean the resins originating from condensation reactions between mono- and polyfunctional acids with anhydrides, polyols or esters.

Epoxy resins are intended to mean the products originating from the chemistry of the diglycidyl ethers of bisphenol A, which are also called BADGE, and the products originating from the chemistry of the glycidyl ether of novolac resins. The BADGE resins employed have molecular weights of, generally, from about 600 g/mol to about 6,000 g/mol.

The coating compositions according to the invention may contain one or several of the resins listed above and also other resins or polymers improving, for example, adhesion, such as the epoxy/sulfonamide resins described in European Patent Application No. EP 412 888, the resins obtained by polycondensation of aromatic sulfonamide compounds and of aldehydes and/or dicarboxylic acids, described in European Patent Application No. EP 290 342, copolymers of ethylene and unsaturated carboxylic acids or their vinyl or other esters, and, optionally, copolymers of ethylene and vinyl alcohol which are described in PCT/FR95/01740.

Besides the resins and the anticreep additives indicated above, the coating compositions according to the invention may contain various additives and/or fillers such as pigments or dyes, anticratering, reducing and antioxidant agents, reinforcing fillers, and the like as follows:

antioxidants such as copper iodide combined with potassium iodide, phenol derivatives and hindered amines, fluidizing agents, reinforcing and nucleating fillers such as dolomite, calcium carbonates (other than the anticreep additives according to the invention) and/or magnesium carbonates, quartz, boron nitride, the kaolin sold under the trade name FRANTEX®, wollastonite, titanium dioxide, ballotini, talc, mica, which are sold under the names DOLOMIE® (calcium magnesium carbonate), PLASTORIT (a mixture of quartz, mica and chlorite), MINEX® (feldspar) and carbon black, UV stabilizers such as resorcinol derivatives, benzotriazoles and salicylates, anticratering agents or spreading agents, pigments such as titanium dioxide, carbon black, cobalt oxide, nickel titanate, molybdenum disulfide, aluminum flakes, iron oxide, zinc oxide and organic pigments like phthalocyanine and anthraquinone derivatives.

Into the compositions of the invention may be incorporated additives chosen especially from those described above and whose respective proportions remain within the limits usually encountered in the field of the powder compositions for the coating of substrates, especially metallic substrates. In general, up to 100% by weight of additives are incorporated, that is, these fillers may represent the same weight as the quantity of resin(s).

These additives can be incorporated into the compositions of the invention by any means. The above compositions may be obtained in a known manner by any technique for mixing the constituents in the molten state, such as extrusion or compounding on a single-screw or twin-screw extruder or on a co-kneader, or by any continuous or noncontinuous technique as, for example, with the aid of an internal mixer.

In general, the particle size of the powders in accordance with the invention may be between about 5 $\mu$m and about 1 mm.

A first process for obtaining powder compositions according to the invention consists of kneading, in the molten state, resin(s), anticreep additive(s) and other possible additive(s) and/or filler(s) in a kneader of suitable type. The kneading temperature may be between about 150° C. and about 300° C. and preferably between about 180° C. and about 230° C.

A master mix concentrate or a composition corresponding to the desired final product concentration may be prepared.

The final product is ground to the desired particle size for the coating by using the usual techniques known to those with ordinary skill in the powder coating art. A spraying or precipitation process may also be used.

Another process for preparing these powder mixtures consists of dry-mixing all or a proportion (in which case a master mix is prepared) of the various components which have been previously converted into fine powder form. This dry-mixing or dry-blending generally does not require any special equipment. It can be performed at ambient temperature.

As indicated above, the compositions according to the invention are in the form of intimate mixtures. In the case of compositions prepared by kneading in the molten state, the quantity of anticreep additive(s) may represent from about 0.1% to about 50%, and preferably from about 1% to about 40%, of the total mass or weight of the final composition. In the case of compositions prepared by dry-mixing, the quantity of anticreep additive(s) may represent from about 0.1% to 5%, and preferably from about 0.2% to about 3%, of the total mass or weight of the final composition.

According to a known technique which in itself does not constitute a subject-matter of the invention, the metal substrate, and especially one made of common steel, aluminum or aluminum alloy, may have been subjected to one or several of the following surface treatments before being coated with the powders of the present invention, no limitation being implied by this list: coarse degreasing, alkaline degreasing, scrubbing, shot-blasting or sandblasting, fine degreasing, hot rinsing, phosphating degreasing, iron/zinc/tri-cation phosphating, chromating, cold rinsing and chromic rinsing.

The present invention also relates to the use of the powder compositions as defined above for the coating of metal substrates and to the substrates thus coated. The metal substrate may be chosen from a wide range of products. For example, it may be pieces of plain or galvanized steel, or parts made of aluminum or of aluminum alloy. The metal substrate may be of any thickness, for example, ranging from the order of a tenth of a millimeter to the order of several decimeters.

Examples of metal substrates suitable for being coated with a composition according to the invention include but are not limited to: degreased, smooth or shot-blasted steel, phosphated degreased steel, iron or zinc phosphated steel, Sendzimir galvanized steel, zinc-electroplated steel, bath-galvanized steel, cathodic deposition steel, chromated steel, anodized steel, carborundum-sanded steel, degreased aluminum, smooth or shot-blasted aluminum and chromated aluminum.

The composition according to the invention is therefore applied in powder form onto the metal substrate. The application of the composition in powder form can take place according to the application techniques usually employed in the art. Grinding of the powders may be performed in equipment that is cooled cryogenically or with high air input (impeller, hammer or disc mills and the like). The powder particles obtained are selected in suitable equipment to remove the unwanted particle size cuts, for example grains that are too coarse and/or too fine.

The powder application techniques which are preferred for performing the coating of the substrates according to the invention include but are not limited to: electrostatic spraying, dipping in a fluidized bed and the electrostatic fluidized bed (for example, as described in Patent document nos. DD 277 395 and DD 251 510).

In electrostatic spraying, the powder is introduced into a gun where it is conveyed by compressed air and enters a nozzle raised to a high voltage, generally between ten and several hundred kilovolts. The applied voltage may be positive or negative in polarity. The flow rate of powder in the gun is generally from about 10 g/min to about 200 g/min, and preferably from about 50 g/min to about 120 g/min. As it passes through the nozzle, the powder is charged electrostatically. The powder particles conveyed by the compressed air are applied onto the metal surface to be coated, the said surface itself being grounded, that is, connected to a zero electrical potential. The powder particles are retained on this surface by their electrostatic charge. These forces are sufficient to allow the article, once it is coated with powder, to be moved and then heated in an oven to a temperature which causes the powder to melt.

Electrostatic spraying of the compositions according to the invention, whatever the polarity of application, offers an undoubted advantage because it is possible to employ the existing standard industrial plants designed for electrostatic spraying of powder coatings with a single polarity. In this case, it is desirable to subject the metal substrate to a surface treatment or preparation before it is coated with powder.

In general, a powder of mean particle size of from about 5 $\mu$m to about 100 $\mu$m and preferably from about 20 $\mu$m to about 80 $\mu$m can be employed. The thickness of the coating is preferably on the order of about 110±20 $\mu$m.

In the case of the process of dipping in a fluidized bed, the metal substrate to be coated is carefully prepared, for example, by being subjected to one or several of the surface treatments listed above. Then the metal substrate is heated in an oven to a specific temperature according especially to the nature of the said substrate, its form, its thickness and the desired coating thickness as is well known to those with ordinary skill in the fluidized bed coating art. Thus heated, the substrate is next immersed in a powder composition of the invention, which is kept in suspension by a gas circulating in a tank with a porous bottom. The powder melts on contact with the hot metal surfaces and thus forms a deposit whose thickness is a function of the temperature of the substrate and of the duration of its immersion in the powder.

In fluidized bed dip-coating, the particle size of the powders used in the fluidized bed may be from about 10 μm to about 1,000 μm and preferably from about 40 μm to about 160 μm. In general, the coating thickness may be from about 150 μm to about 1,000 μm, preferably on the order of about 400±50 μm.

The present invention also relates to a composite material comprising a metal substrate and a coating, in the form of film obtained by melting the powder compositions of the invention.

3. Description of the Preferred Embodiments 1) The following products are employed in the examples:

PA-11 denotes a polyamide 11 (or nylon 11) of number average molecular weight Mn, before application, of from about 9,000 g/mol to about 15,000 g/mol.

Terpolymer 1 denotes a copolymer containing ethylene units, about 6% by weight of ethyl acrylate units and about 3% by weight of maleic anhydride units, with a melt index equal to about 200 g/10 min measured according to NFT standard 51016, and sold under the trade name LOTADER® 8200. (This is a resin intended to improve the adhesion of the polyamide resin to the substrate in accordance with the teaching of patent application PCT/FR95/01740.)

Terpolymer 2 denotes a copolymer of vinyl alcohol containing about 44 mol % of ethylene units, with a melt index equal to about 12 g/10 min measured according to NFT standard 51016 (measured at 210° C. under a 2.16 kg load), grafted with about 5% of phthalic anhydride (expressed as weight % of the terpolymer 2), and sold under the trade name SOARNOL® A. (This is a resin intended to improve the adhesion of the polyamide resin to the substrate in accordance with the teaching of patent application PCT/FR95/01740.)

Filler 1: precipitated (acicular) calcium carbonate, uncoated, with a specific (BET) surface area equal to about 11 $m^2/g$, measured according to ISO standard 9277, and a free-flow apparent specific weight equal to approximately 150 g/l, measured according to ISO standard 903, sold under the trade name SOCAL 90A. This is an anticreep additive within the meaning of the present invention.

Filler 2: precipitated (acicular) calcium carbonate, uncoated, with a specific (BET) surface area equal to about 10 $m^2/g$, measured according to ISO standard 9277, and a free-flow apparent specific weight equal to about 230 g/l, measured according to ISO standard 903, sold under the trade name SOCAL P3.

Filler 3: nonacicular calcium magnesium carbonate containing about 21% by weight of MgO, sold under the trade name DOLOMIE DRB 4/15.

Filler 4: acicular wollastonite (calcium silicate) with a specific (BET) surface area equal to about 4 $m^2/g$, measured according to ASAP standard 2000, sold under the trade name NYAD 1250.

Filler 5: imbrication of mica, chlorite (magnesium-potassium-aluminum hydrosilicate) and quartz ($SiO_2$ 51.1%, $Al_2O_3$ 23.0%, MgO 12.5%, FeO 3.6%, $K_2O$ 2.8%, relative density 2.75), sold under the trade name PLASTORIT NAINTSCH.

Filler 6: anhydrous alumina, potassium and sodium double silicate ($SiO_2$ 61.0%, $Al_2O_3$ 23.3%, $Fe_2O_3$ trace, CaO 0.7%, MgO trace, $Na_2O$ 9.8%, $K_2O$ 4.6%, specific weight 2.61, mean statistical diameter of the particles about 4.5 μm), sold under the trade name MINEX 7.

In all that follows and unless shown otherwise, the proportions of the constituents correspond to parts by weight.

The powder compositions based on PA-11, prepared in the examples below, were applied onto metal substrates either by electrostatic spraying (ES) or by immersion (I).

The particle size of the compositions applied by ES was mainly between about 20 μm and about 80 μm, and that of the powders applied by immersion mainly between about 40 μm and about 160 μm. In the case of the adhesion-promoting resins (terpolymers 1 and 2), the particle size was smaller than about 60 μm.

After the composition had melted, the coating film thickness was on the order of about 110±20 μm (ES application) and on the order of about 400±50 μm (I application).

EXAMPLES 1 TO 5

Formulations and characteristics of the powders before application:

Table 1 below summarizes the grey-colored coating compositions typically used with an adhesion primer; they were obtained by mixing the various constituents in a kneader at a temperature between about 190° C. and about 225° C. and with a residence time on the order of about 30 seconds. The products in Examples 1 to 5 were next ground to the desired particle size for application by the immersion route.

TABLE 1

| Example No. | Natural PA-11 | Pigment ($TiO_2$, carbon black etc.) | Antioxidant and spreading agents | Filler 1 | Filler 2 | Filler 3 |
|---|---|---|---|---|---|---|
| 1 | 1000 | 120 | 9 | | | |
| 2 | 1000 | 120 | 9 | 75 | | |
| 3 | 1000 | 120 | 9 | | 75 | |
| 4 | 1000 | 120 | 9 | | | 75 |
| 5 | 1000 | 120 | 9 | 150 | | |

Application:

Before the surface coating was applied, all the substrates (100 mm×100 mm×3 mm steel panels) were subjected to degreasing followed by shot-blasting. They were preheated in a ventilated oven for 10 min at 330° C. and then dip-coated in the fluidized bed for 4 sec. After coating, the substrates cooled freely in the ambient air. The thickness of the films was about 400±50 μm.

Evaluation:

Thus coated, the panels were next evaluated in saline mist according to NF standard×41 002, i.e., a Saint Andrew's cross-shaped incision was made in the films down to the metal and the creep was measured visually from this injury. Maximum creep corresponds to a value of 35 mm.

The creep measured and given here (which corresponds to the distance of detachment of the film starting at the injury) is the average of the maximum and minimum value, these being measured on the eight edges of the incision, excluding the "point" effect, where the creep may be clearly greater owing to the stagnation and the draining of the salty water.

The results obtained after 1,000 hours of saline mist exposure are collated in Table 2.

TABLE 2

| Example No. | Creep measured (mm) |
| --- | --- |
| 1 (comparative) | 35* |
| 2 | 5 |
| 3 (comparative) | 35 |
| 4 (comparative) | 35 |
| 5 | 10 |

*total creep reached after 500 hours of test

EXAMPLES 6 TO 9

Formulations and characteristics of the powders before application:

Table 3 details compositions produced in a kneader at a temperature of between about 190° C. and about 225° C. and with a residence time on the order of 30 seconds. They are based on pure (also called natural) PA-11 or else white PA-11 (natural PA-11 additionally containing 100 parts of white pigments, e.g., $TiO_2$). After kneading, the mixtures were ground to obtain a powder of the desired particle size for application by an electrostatic route.

TABLE 3

| Example No. | Natural PA-11 | White PA-11 | Pigment (carbon black, blue etc), antioxidant and spreading agents | Filler 1 | Filler 3 | Filler 5 |
| --- | --- | --- | --- | --- | --- | --- |
| 6 (black) | 800 | | 24 | | 125 | 75 |
| 7 (black) | 800 | | 24 | 125 | | 75 |
| 8 (white) | | 1000 | 14 | | 40 | 50 |
| 9 (white) | | 1000 | 14 | 40 | | 50 |

Application:

The powders obtained above were deposited at ambient temperature by electrostatic spraying onto steel panels of dimensions 100 mm×100 mm×1 mm. The panels had previously been subjected to degreasing and then to a mechanical surface treatment (shot-blasting). During the application the metal surface was at zero potential.

Once coated, a panel was immediately moved into a ventilated oven maintained at about 220° C., where it stayed for 4 minutes, and was then taken out of the oven and cooled freely in air.

The conditions for application by an electrostatic (ES) route are summarized as follows:

| Examples 6 to 9 |
| --- |
| Electrostatic application onto 100 mm × 100 mm × 1 mm steel panel |
| Shot-blasted substrate |
| +30 kV positive ES |
| 4 min melting in ventilated oven at 220° C. |

Evaluation:

The evaluation was done using the same method as that described for Example 1.

The results of the creep resistance test, obtained after 250 hours of saline mist exposure, are collated in Table 4.

TABLE 4

| Example No. | Creep measured (mm) |
| --- | --- |
| 6 (comparative) | 15 |
| 7 | 8 |
| 8 (comparative) | 35 |
| 9 | 19 |

EXAMPLES 10 TO 16

Formulations and characteristics of the grey powders before application:

Tables 5 and 6 below detail the grey-colored compositions produced in a kneader at a temperature of between about 190° C. and about 225° C. and with a residence time on the order of 30 seconds.

TABLE 5

| Example No. | Natural PA-11 | Terpolymer | Pigment ($TiO_2$, carbon black, 2 | etc.) | Antioxidant and spreading agents | Other fillers |
| --- | --- | --- | --- | --- | --- | --- |
| | | | 1 | 2 | | |
| 10 to 16 | 1000 | 80 | 40 | 120 | 9 | see TABLE 6 |

TABLE 6

| Example No. | Filler 1 | Filler 2 | Filler 3 | Filler 4 | Filler 5 |
|---|---|---|---|---|---|
| 10 | | | | | |
| 11 | 75 | | | | |
| 12 | 150 | | | | |
| 13 | | 150 | | | |
| 14 | | | 150 | | |
| 15 | | | | 150 | |
| 16 | | | | | 150 |

After kneading, the products of Examples 10 to 16 were ground to a suitable particle size for application by an immersion route and then applied under the same conditions as those of Example 1.

The evaluation was done using the same method as that described for Example 1. The results are given in Table 7.

TABLE 7

| Example No. | Creep measured at 1000 h (mm) |
|---|---|
| 10 (comparative) | 35 |
| 11 | 16 |
| 12 | 16 |
| 13 (comparative) | 35 |
| 14 (comparative) | 35 |
| 15 (comparative) | 35 |
| 16 (comparative) | 35 |

EXAMPLES 17 TO 20

Formulations and characteristics of the natural and white powders before application:

Table 8 below details the compositions produced in a kneader at a temperature of between about 190° C. and about 225° C. and with a residence time on the order of 30 seconds.

TABLE 8

| Example No./Color | Natural PA-11 | Terpolymer 1 | Terpolymer 2 | Pigment (TiO₂, etc.) | Filler 1 |
|---|---|---|---|---|---|
| 17/natural | 1000 | 80 | 40 | | |
| 18/natural | 1000 | 80 | 40 | | 150 |
| 19/white | 1000 | 80 | 40 | 140 | |
| 20/white | 1000 | 80 | 40 | 140 | 150 |

After kneading, the products in Examples 17 to 20 were ground to a suitable particle size for application by an immersion route and then applied in the same conditions as those in Example 1.

The evaluation was done using the same method as that described for Example 1 above. The results are given in Table 9.

TABLE 9

| Example No./color | Creep at 1000 h (mm) |
|---|---|
| 17/natural (comparative) | 35* |
| 18/natural | 15 |
| 19/white (comparative) | 31 |
| 20/white | 21 |

*total creep reached after 500 hours of test

EXAMPLES 21 TO 25

Formulations and characteristics of the powders before application:

Tables 10 and 11 below detail the compositions produced in a kneader at a temperature of between about 190° C. and about 225° C. and with a residence time on the order of 30 seconds.

TABLE 10

| Example No. | Natural PA-11 | Terpolymer 1 | Terpolymer 3 | Pigment (TiO₂, carbon black, etc.) | Antioxidant and spreading agents | Other Fillers |
|---|---|---|---|---|---|---|
| 21 to 25 | 1000 | 80 | 40 | 120 | 9 | see TABLE 11 |

TABLE 11

| Example No. | Filler 1 | Filler 3 | Filler 5 | Filler 6 |
|---|---|---|---|---|
| 21 | | 50 | 100 | |
| 22 | 50 | | 100 | |
| 23 | | | 100 | 50 |
| 24 | | 100 | | 50 |
| 25 | 100 | | | 50 |

After kneading, the products in Examples 21 to 25 were ground to a suitable particle size for application by an immersion route and then applied in the same conditions as those in Example 1. The evaluation was done using the same method as that described for Example 1 above. The results are given in Table 12.

TABLE 12

| Example No. | Creep measured at 1000 h (mm) |
|---|---|
| 21 (comparative) | 20 |
| 22 | 10 |
| 23 (comparative) | 35 |
| 24 (comparative) | 35 |
| 25 | 20 |

What is claimed is:

1. A composite material comprising a metal substrate and a coating layer, the coating layer comprising a self-adhesive composition which comprises at least one resin selected from the group consisting of thermoplastic resins and heat-curable resins, and further comprises at least one precipitated calcium carbonate (PCC) in the form of powder, wherein the uncoated precipitated calcium carbonate (PCC) powder has a specific (BET) surface area, measured according to ISO standard 9277, of from about 7 m²/g to about 12 m²/g and a free-flow apparent specific weight, measured according to ISO standard 903, of from about 130 g/l to about 180 g/l.

2. The composite material according to claim 1, wherein the precipitated calcium carbonate (PCC) has a free-flow apparent specific weight equal to about 150 g/l.

3. The composite material according to claim 1, wherein the resin is a polyamide.

4. The composite material according to claim 3, wherein the polyamide is selected from the group consisting of polyamide-11, polyamide-12 and mixtures thereof.

5. The composite material according to claim 1, wherein the self-adhesive composition further comprises at least one additive selected from the group consisting of fillers, pigments, antioxidants, reducing agents, fluidizing agents, spreading agents, dyes, anticratering additives, reinforcing filers, nucleating fillers and UV stabilizers.

6. The composite material according to claim 1, wherein the self-adhesive composition is in the form of powder.

7. The composition material according to claim 6, wherein the coating layer is formed by melting a layer of the powdered composition.

* * * * *